Jan. 26, 1954 R. W. GUNDERSEN 2,667,209
RESILIENTLY SUPPORTED LOCOMOTIVE SEAT
Filed Dec. 6, 1950 2 Sheets-Sheet 1

INVENTOR.
Ralph W. Gundersen
BY
Harvey M. Gillespie
Atty.

Jan. 26, 1954   R. W. GUNDERSEN   2,667,209
RESILIENTLY SUPPORTED LOCOMOTIVE SEAT
Filed Dec. 6, 1950   2 Sheets-Sheet 2
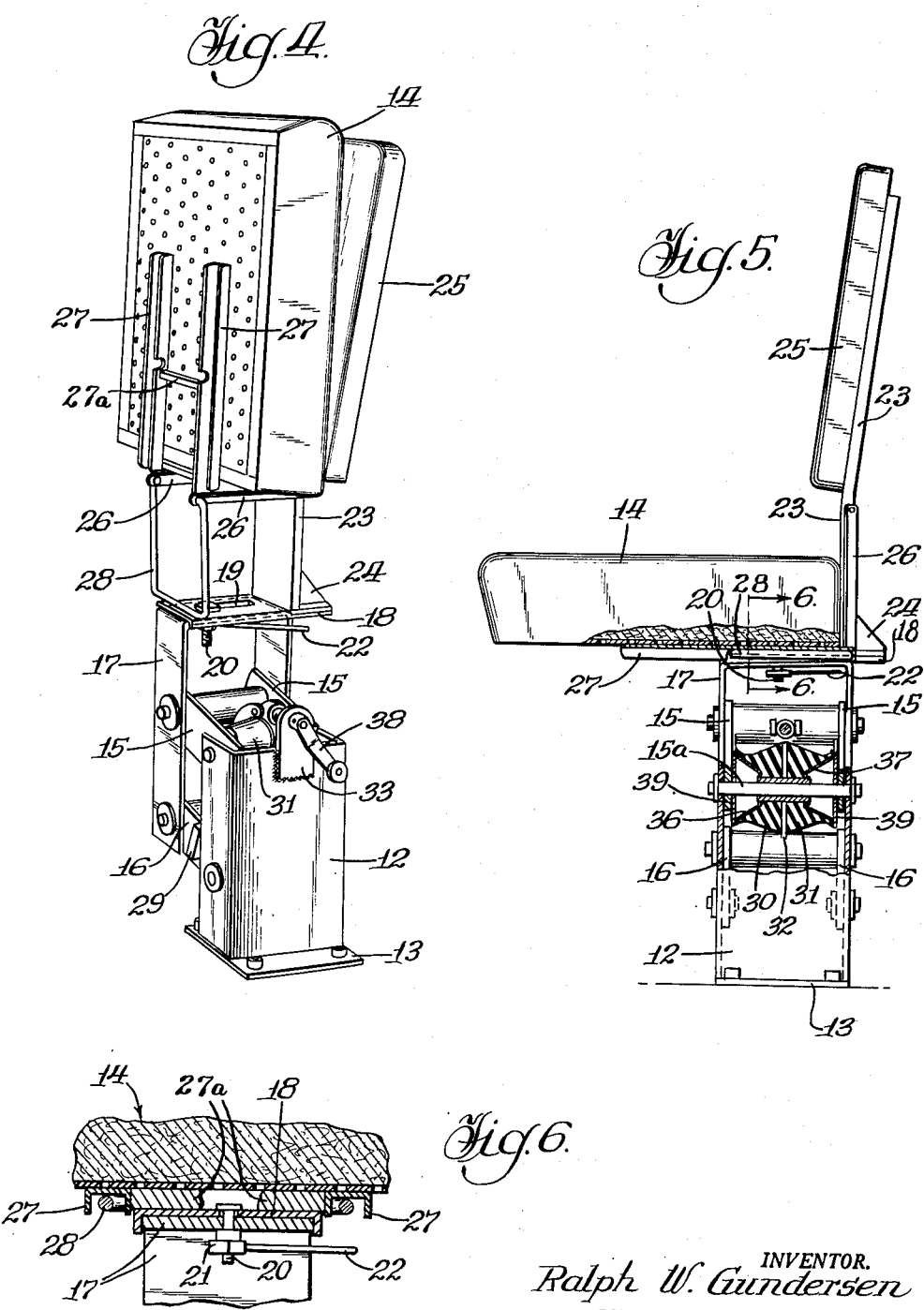

Patented Jan. 26, 1954

2,667,209

UNITED STATES PATENT OFFICE 2,667,209

RESILIENTLY SUPPORTED LOCOMOTIVE SEAT

Ralph W. Gundersen, St. Paul, Minn., assignor to Coach & Car Equipment Corporation, Chicago, Ill., a corporation of Illinois Application December 6, 1950, Serial No. 199,520

12 Claims. (Cl. 155—51)

This invention relates to spring seats for use particularly in locomotive cabs and similar situations, and it has for its general object the provision of an improved resilient seat for supporting an operator of a locomotive, bus, railway car or other vehicles of transportation yieldingly in convenient position with respect to the controls of such vehicle.

A more specific object of the invention is to provide a structure of this type in which the parts are readily adjustable so as to be effective for supporting an operator yieldingly in position at the desired height above the floor regardless of the weight and stature of the operator, and to provide that in all cases the support shall be easy and smooth without any appreciable side sway or other movement which would have a tendency to make it difficult for the operator to remain always in convenient position with respect to the controls. In this connection means is provided for conveniently shifting the seat forwardly and backwardly relative to the controls of the vehicle without affecting the smoothness and the effectiveness of the action of the spring support.

It is another object of the invention to provide an improved arrangement of means for holding the seat member in normal operative position or alternatively for holding the seat member turned upwardly out of the way so as to permit the operator to stand comfortably in position at his post when it is essential or desirable for him to assume a standing position.

Another object of the invention is to improve devices of this type in sundry details hereinafter pointed out. The preferred means by which the several objects of the invention are accomplished are illustrated in the accompanying drawings, in which Fig. 1 is a perspective view of the improved seat in position for supporting a locomotive operator at his post.

Fig. 4 is a perspective view of my improved mechanism, with the seat member turned upwardly for permitting the operator to assume a standing posture.

Fig. 5 is a side view of the seat as shown in Fig. 2, with some of the parts shown in vertical section; and Fig. 6 is a vertical sectional view taken substantially at the line 6—6 in Fig. 5.

Figure 1:
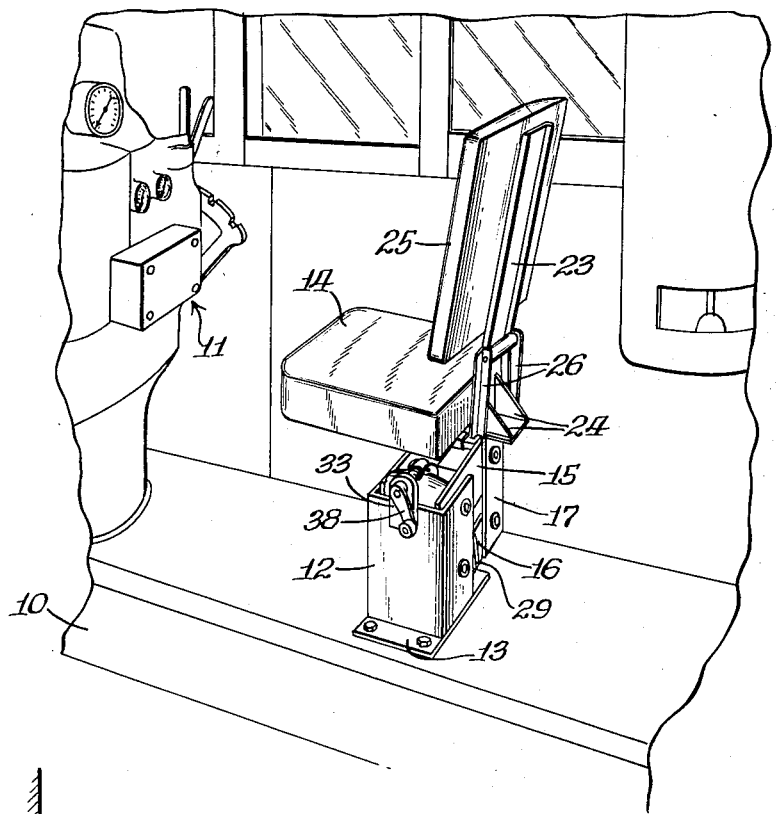

Referring now to the several figures of the drawings, in which corresponding parts are indicated by the same reference characters, 10 indicates a portion of a locomotive cab with the preferred form of the improved seat mounted in convenient position with respect to the control mechanism 11 of any approved type. In this arrangement the improved seat comprises a standard 12 mounted in position by means of a base 13. The standard 12 is preferably formed from sheet metal bent into shape and secured to the base 13 by welding or in any other suitable manner.

The seat member 14 of the improved structure is movably mounted on the standard 12 so as to be yieldingly supported therefrom by means of two sets of arms 15 and 16 pivotally connected with the standard in transverse position with respect thereto at opposite faces thereof, all of said arms 15 and 16 being of substantially the same length except that the lower arms 16 are of very slightly greater length than the arms 15. As is clearly shown in Fig. 5, the arms 15 are pivotally mounted on the standard 12 by means of a cross-bar 15-a. At their outer end portions the arms 15 and 16 of each of said sets are pivotally connected with one of the vertically positioned bar portions of a supporting member for the seat 14, such supporting member being in the form of a heavy metal yoke 17. For securing the seat member on said supporting member an inverted channel member 18 is slidably mounted on the supporting member so as to be movable forwardly and backwardly thereon. As is best shown in Fig. 4, the channel member 18 is provided with a slot 19 extending forwardly and backwardly therein, in which slot a heavy bolt 20 is mounted for holding the channel member in the desired adjusted position with respect to the yoke, said bolt being provided on its lower end portion with a nut 21 for locking the parts strongly in adjusted position, the nut being provided with a pin 22 extending therefrom for enabling the operator readily to turn the nut into and out of tightened position on the bolt.

Means is provided for mounting the seat member 14 on the channel member 18, comprising a post member 23 fixedly mounted at its lower end on the top face of said channel member, with triangular bracing brackets 24 secured rigidly in position for reinforcing the structure. A back member 25 of any approved form is mounted on the front face of the post 23 in suitably spaced position above the seat member 14. Just below the lower edge of the back member 25, two heavy angle-bars 26 are pivotally mounted at their upper end portions on the post 23 at opposite sides of the post, as shown in Fig. 1, said bars 26 being rigidly connected at their lower ends with heavy channel bars 27 secured in fixed position on the bottom face of the seat member 14, as is best shown in Fig. 4. The arrangement is such that the seat member 14 in its lowered position as shown in Fig. 5 is supported directly by the supporting member 17 and the channel member 18 thereon, since a bar 27ª located beneath the seat rests upon the channel member 18. When the seat member 14 is moved upwardly from the position as shown in Fig. 5 to the position as shown in Fig. 4, a bail member 28 pivotally mounted on the lower end portions of the bars 26 and normally in horizontal position immediately underneath the seat member 14 (see Fig. 5) swings downwardly into vertical position (see Fig. 4) so as to be adapted by engagement with the channel member 18 to hold said seat member 14 in its raised position out of the way so as to permit the operator to stand comfortably at his post.

Figure 2:
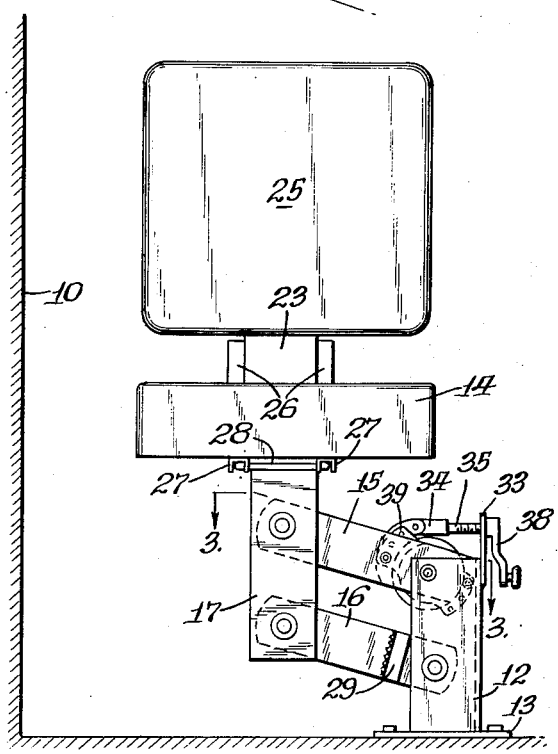
Fig. 2 is a front view of the seat as shown in Fig. 1.
Figure 3:
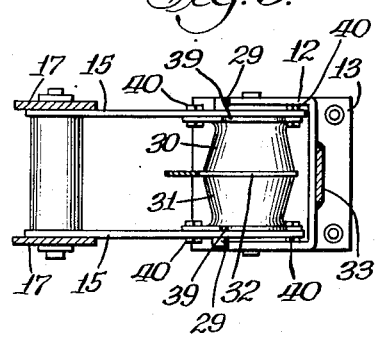
Fig. 3 is a horizontal sectional view taken substantially at the line 3—3 in Fig. 2.

Means is provided for holding the arms 15 and 16 yieldingly in raised position as shown in Fig. 2, with a stop element 29 carried by one of the arms 16 in engagement with the adjacent portion of the standard 12 for limiting the upward movement of the seat member 14. The yielding means for supporting the seat member 14 comprises two blocks 30 and 31 of rubber mounted on the cross-bar 15–a and strongly bonded to the opposite faces of an interposed metal plate 32 which is connected by means of a link of adjustable length with a bracket 33 at the upper end portion of the standard 12. This adjustable link comprises a link member 34 pivotally connected with the plate 32, and a link member 35 connected at one end with said link member 34 by means of screw-threads and rotatably connected at its other end to said bracket 33. The outer face portions of the blocks 30 and 31 are strongly bonded to metal plates 36 and 37 which are connected respectively with the arms 15. A crank handle 38 is provided on the end of the link member 35 for rotating the link member with respect to the link member 34 for adjusting the effective length of the link comprising said link members 34 and 35 and thus causing the plate 32 to have a rotary movement with respect to the standard 12.

By reducing the effective length of this link 34—35, the plate 32 and the connected inner face portions of the blocks 30 and 31 are rotated in clockwise direction in Fig. 2 with respect to the outer face portions of said blocks so as to apply a heavy torsional tension on such blocks. In the improved construction the plates 36 and 37 are connected with the arms 15 by means of cooperating plates 39 rigidly connected with said plates 36 and 37, such plates 39 being extended in opposite directions beyond the plates 36 and 37 and being connected by bolts 40 with the arms 15 at opposite sides of the axis on which said blocks 30 and 31 are mounted. The plates 39 are provided with a plurality of openings for the bolts 40, as is shown in Fig. 2, so as to provide for a substantial degree of angular adjustment of said plates 36 and 37 with respect to the arms 15.

An operator is able very quickly and easily to adjust the improved seat to meet his requirements to advantage. By loosening the nut 21 by the use of the pin 22, the channel member 18 and the seat member 14 mounted thereon are released from the supporting member comprising the yoke 17 for ready adjustment of the seat member to the desired position forwardly and backwardly, after which the nut is again tightened. The handle 38 is then given the required number of turns for increasing or decreasing the tension circumferentially on the rubber blocks 30 and 31 to suit the weight of the operator. The arrangement is such that by the use of the handle 38 the operator can very easily adjust the tension to suit his particular individual needs.

By the use of the improved arrangement comprising the two sets of pivotally mounted supporting arms 15 and 16, with the arms 15 and 16 arranged to stand at all times in substantially parallel relationship to each other and the lower arm 16 being slightly longer than the upper arm 15, the seat member 14 is adapted to move upwardly and downwardly by a substantially rectilinear translation movement without any substantial lateral swaying movement, since the greater length of arm 16 tends to tilt the seat support 17 in a direction to counteract the lateral swaying of the seat during the arcuate movements of the arms 15 and 16 as the seat member is shifted from its level supporting position. It has been found in practice that when the tension on the blocks 30 and 31 is properly regulated to suit the weight of the operator, the seat provides exceedingly easy riding support for the operator.

While the form and arrangement of the parts as shown in the drawings and as above described are preferred, the invention is not to be limited strictly to the specific construction and arrangement shown and described, it being understood that changes might well be made in the form and arrangement of the parts without departing from the spirit of the invention.

I claim:

1. A yielding seat structure, comprising in combination, a standard having a lateral side face, upper and lower arms of slightly different lengths pivotally mounted on said standard and extending transversely of said lateral side face, a seat supporting member pivotally mounted on the outer ends of said arms so as to move upwardly and downwardly therewith by a substantially rectilinear translation movement, the said arms of different lengths serving to tilt the seat support so as to minimize lateral swaying of the seat during the arcuate movements of the said arms, and yielding means connected with one of said arms adapted by its torsional strength to hold said seat member yieldingly at a selected level with respect to said standard, and means manually adjustable for varying the torsion of said yielding means.

2. A yielding seat structure as specified in claim 1, in which the lower arm is very slightly longer than the upper arm and in which said arms are mounted so as to stand normally in substantially parallel relationship to each ither.

3. A yielding seat structure as specified in claim 1, in which said yielding means comprises a block of rubber provided with metal plates firmly bonded with opposite face portions of the block, and in which one of said plates is connected with one of said arms and the other plate is connected with said standard.

4. A yielding seat structure as specified in claim 1, in which said yielding means comprises a block of rubber provided with metal plates firmly bonded with opposite face portions of the block, and in which one of said plates is connected with one of said arms and the other plate is adjustably connected with said standard so as to enable the block to be stressed circumferentially with the seat supporting member in its uppermost position.

5. A yielding seat structure as specified in claim 1, in which said yielding means comprises two blocks of rubber bonded to opposite faces of an interposed metal plate with the outer face portions of the blocks bonded to other metal plates, and in which said interposed plate is adjustably connected with said standard and said other plates are operatively connected to the upper of said pivotally mounted arms.

6. A yielding seat structure as specified in claim 1, in which the said pivotally mounted transversely extending arms include two sets, one set at the front portion of the standard and another set at the rear portion with the seat support pivotally mounted between said two sets of arms, in which said yielding means comprises two blocks of rubber bonded to opposite faces of an interposed metal plate with the outer face portions of the blocks bonded to other metal plates, and in which said interposed plate is adjustably connected with said standard and said other plates are pivotally fixedly connected respectively with selected ones of said arms at opposite faces of said blocks.

7. A yielding seat structure as specified in claim 1, in which stop means is provided on one of said arms in position to engage a part of said standard limiting the upward movement of the seat member with respect to the standard.

8. A yielding seat structure as specified in claim 1, in which said seat supporting member comprises a yoke member to which said arms have pivotal connection and to which the seat has adjustable connection.

9. A yielding seat structure as specified in claim 1, in which the seat supporting member pivotally mounted on said arms comprises a yoke member to which said arms have pivotal connection and an inverted channel member slidably adjustably mounted on said yoke member, with releasable means for connecting said channel member fixedly to said yoke member in adjusted position thereon.

10. A yielding seat structure as specified in claim 1, in which the seat supporting member pivotally supported on said arms comprises a yoke member to which said arms have pivotal connection, an inverted channel member is adjustably mounted on said yoke member, and means is provided for connecting said channel member and said yoke member together, comprising a slot extending forwardly and backwardly in one of said members, in which slot a bolt carried by the other of said members is slidably mounted for connecting the members in adjusted position with respect to each other.

11. A yielding seat structure as specified in claim 1, in which the seat supporting member pivotally supported on said arms comprises a substantially rigid supporting member including a post extending upwardly therefrom, bars of angular cross section secured to the seat for pivotally connecting the seat to said post at a substantially higher level than that of the seat member in its normal position, and movably mounted means adapted when said seat member is turned upwardly out of the way to hold the seat member releasably in said turned position.

12. A yielding seat structure as specified in claim 11, in which said movably mounted holding means comprises a link pivotally connected with said seat member and adapted by pressure on said supporting member when the seat member is turned upwardly out of the way to hold the seat member releasably in such turned position.

RALPH W. GUNDERSEN.

References Cited in the file of this patent

UNITED STATES PATENTS

| Number | Name | Date |
| --- | --- | --- |
| 715,147 | Redington | Dec. 2, 1902 |
| 1,960,939 | Hansen | May 29, 1934 |
| 2,008,209 | Herold | July 16, 1935 |
| 2,049,550 | Van Dresser | Aug. 4, 1936 |
| 2,373,694 | Lenz | Apr. 17, 1945 |
| 2,460,596 | Roche | Feb. 1, 1949 |